US010417607B1

(12) United States Patent
Gaytan Manzano

(10) Patent No.: US 10,417,607 B1
(45) Date of Patent: Sep. 17, 2019

(54) STATUS UPDATES DURING LATENCY

(71) Applicant: Amazon Technologies, Inc., Seattle, WA (US)

(72) Inventor: Jose Gabriel Gaytan Manzano, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 436 days.

(21) Appl. No.: 14/716,798

(22) Filed: May 19, 2015

(51) Int. Cl.
| G06Q 10/08 | (2012.01) |
| H04L 12/24 | (2006.01) |
| G06Q 20/20 | (2012.01) |
| H04L 29/08 | (2006.01) |
| H04L 12/26 | (2006.01) |

(52) U.S. Cl.
CPC .......... *G06Q 10/087* (2013.01); *G06Q 10/08* (2013.01); *G06Q 10/083* (2013.01); *G06Q 10/0875* (2013.01); *G06Q 20/203* (2013.01); *H04L 41/12* (2013.01); *H04L 43/04* (2013.01); *H04L 43/16* (2013.01); *H04L 67/02* (2013.01); *H04L 67/10* (2013.01)

(58) Field of Classification Search
CPC .................................................. G06Q 10/087
USPC ........................................................ 705/28
See application file for complete search history.

(56) References Cited

U.S. PATENT DOCUMENTS

| 5,794,211 A * | 8/1998 | Goodwin, III | ......... G06Q 20/20 705/16 |
| 6,012,040 A * | 1/2000 | Goodwin, III | ....... G06Q 20/201 705/20 |
| 6,553,349 B1 * | 4/2003 | Goodwin, III | ......... G06Q 20/20 235/375 |
| 2004/0210542 A1 * | 10/2004 | Sweeney | ................ G06Q 30/00 705/400 |
| 2006/0190236 A1 * | 8/2006 | Malloy | ................. H04L 41/145 703/22 |
| 2008/0082293 A1 * | 4/2008 | Hochmuth | .............. H04L 41/06 702/178 |
| 2008/0256554 A1 * | 10/2008 | Yassin | ....................... G06F 8/24 719/315 |
| 2011/0276394 A1 * | 11/2011 | Chan | ................. G06F 17/30876 705/14.49 |
| 2014/0244309 A1 * | 8/2014 | Francois | ................ G06Q 10/10 705/3 |
| 2015/0186911 A1 * | 7/2015 | Vierra | ................ G06Q 30/0206 705/7.35 |

(Continued)

OTHER PUBLICATIONS

Bush, Stephen F. Smart Grid: Communication-Enabled Intelligence for the Electric Power Grid. New York: John Wiley & Sons, Incorporated, Jan. 6, 2014.*

*Primary Examiner* — Nathan C Uber
(74) *Attorney, Agent, or Firm* — Kilpatrick Townsend & Stockton LLP

(57) ABSTRACT

Techniques for determining a status of a system update with a long latency may be provided. For example, the system may receive a request to update a value associated with an item offered by a merchant. The new value may be transmitted to one or more other computer systems, so that the new value can be updated in a master data store maintained by the one or more other computer systems. The new value can also be stored in a temporary data store associated with the system and the merchant may be informed that the new value was received and is being updated.

14 Claims, 8 Drawing Sheets

(56) References Cited

U.S. PATENT DOCUMENTS

2016/0217506 A1* 7/2016 Kakarala ............ G06Q 30/0278

* cited by examiner

FIG. 3

| Manage Inventory | | | | | | |
|---|---|---|---|---|---|---|
| | | | | | Add a Product | Preferences: 13 columns hidden |
| Filters: | Status ▼ | Fulfilled By ▼ | | | | |
| Status | Image | Item Identifier Condition | Item Description | | Price + Shipping | Lowest Price + Shipping |
| ☐ Active | (speaker image) | A100 Used - Good | Acme Travel Speaker System | $~~10.00~~ $ 9.98 + $5.49 | | √ Lowest |
| | | | √ Unofficial Update Successful. It may take up to 15 minutes to change the price from $10 to $9.98. | | | |
| ☐ Inactive (Out of Stock) | (scanner image) | B200 Refurbished | Beta Brand Desktop Scanner and Digital Filing System – PC | $ 219.99 + -- | | $ 219.95 + $8.49 |
| ☐ Inactive (Out of Stock) | (modem image) | C300 New | Acme Co High-Speed Cable Modem | $ 74.99 + $5.42 | | $ 48.00 |

STATUS UPDATES DURING LATENCY

BACKGROUND

Merchants frequently sell inventory via web pages. They may log into a web page to list a new item from their inventory for purchase. Consumers can browse to the merchant's web page to purchase the item. However, when the merchant attempts to change the price of an item through the web page, the web page may not automatically update with the most recent price that the merchant requested. Web services may cause this latency. For example, web services associated with web page may process the change request and contact other systems to update the price of the item as well. While the web services are processing the change, the merchant may become confused as to whether the new prices are reflected with the web page and refresh the web page browser. When the connection between the merchant and the web page provider is refreshed, the web page provider may not receive the updated price from the web services and the merchant may believe that the information is lost. Thus, the merchant may submit unnecessary change requests.

BRIEF DESCRIPTION OF THE DRAWINGS

Various embodiments in accordance with the present disclosure will be described with reference to the drawings, in which:

FIG. 3 illustrates an example of a user interface for receiving data described herein, according to at least one example;

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, a computer system for determining a status of a system update with a long latency (e.g., any latency that lasts beyond the user's attempt to refresh a network page, etc.). For example, the system may receive a request to update a value (e.g., price, quantity, description, etc.) associated with changing the value for an item offered by a merchant (e.g., for purchase). The new value may be stored as a temporary instance of the new value in a temporary data store associated with the system and the merchant may be informed that the new value was received (e.g., via a notification embedded with a network page accessible to the merchant). The new value can also be transmitted to one or more other computer systems (e.g., web services or service providers). These one or more other computer systems can be confirmed to process the update by changing a master instance of the new value, so that the new value can be updated in a master data store maintained by the one or more other computer systems.

In an illustrative example, a merchant enrolls and interacts with an inventory management system to offer one or more items. The merchant logs into the system through a browser application that displays a web page. The merchant interacts with the web page to update a price for one of the items that the merchant sells through the system. The system receives the updated price and contacts other computer systems (e.g., web services) to update the price in a master data store associated with the inventory management system. The system also stores the price in a temporary data store that is local to the inventory management service of the system (e.g., so it can be accessed quickly, so there is a backup new price stored in the system, etc.). The system may update the web page with a notification to inform the merchant that the system received the new value. While the other systems are processing the new price (e.g., in association with a master data store and/or distributed system of computers, etc.), the merchant is assured that their updated value has been received and will be updated appropriately, based in part on the notification, even though latency may exist between the multiple computer systems in the inventory management system.

Figure 1:
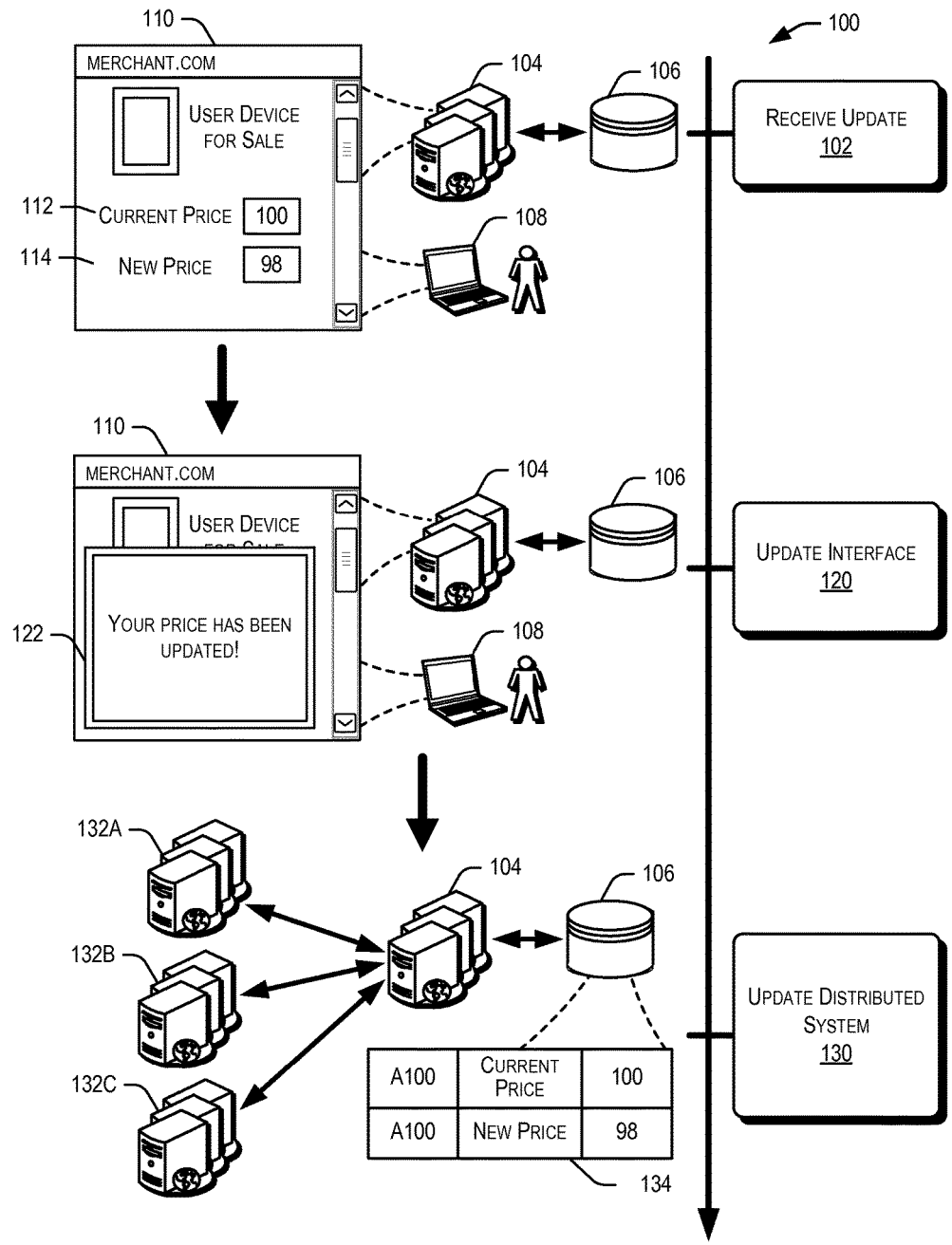
FIG. 1 illustrates an illustrative flow for determining a status of a system update with a long latency described herein, according to at least one example.

FIG. 1 illustrates an illustrative flow for determining a status of a system update with a long latency described herein, according to at least one example. The process 100 can begin with receiving an update at 102. For example, a computer system 104 can interact with a data store 106 and/or interact with a user device 108 (e.g., operated by a merchant, etc.) to receive the data. For example, the data may be received through a network page 110 provided by the computer system 104 and provided by the user device 108. The computer system 104 may store the data in the data store 106. Other types of information may be stored with the data store 106 without diverting from the scope of the disclosure.

The data store 106 may include data from multiple sources. For example, the computer system 104 can receive inventory information for a merchant from a first computer system, price data associated with the items in the merchant's inventory from a second computer system, other merchants' prices from a third computer system, and so on. The computer system 104 can store these multiple sources of data in the data store 106. In some examples, data store 106 may be a temporary data store and/or data may be frequently deleted from data store 106 (e.g., to maintain a relatively small size, to increase likelihood of search/update speeds, etc.). Other actions may be performed (e.g., deleting rows in a data store, optimizing look-up functions in the data store, initiating a transaction log, implementing version control, contacting a data store administrator or web service, etc.).

The user device 108 may access the network page 110 and request information from the computer system 104. For example, user device 108 may request to receive a summary of items in their inventory (e.g., by an active request to receive the data, by a passive request of logging into the system, etc.). The inventory information can include item identifiers, descriptions of the items, and one or more current values (e.g., price for an item, quantity of item offered for purchase, etc.). The inventory information may be displayed on a merchant network page that is accessible to consumers (e.g., so the consumers can determine whether to purchase the item from the merchant, based in part on these values, etc.). The inventory may be offered to consumers (e.g., to purchase, to add to an electronic shopping cart associated with an electronic marketplace of merchants that provide items for purchase to consumers, etc.).

To retrieve the inventory information, computer system 104 may access data store 106. When the inventory information is received (e.g., the current values, current prices, etc.), computer system 104 can populate the network page 110 with the values, including presenting a price for an item in the merchant's inventory. The user device 108 can transmit a request for an update to one or more of the values. For example, when the values are associated with prices, the request may include a price update associated with changing the price for one or more items from a current price to a new price for the same item. As illustrated in FIG. 1, the current value 112 may be "100" and the new value 114 may be "98." The user device 108 can provide the new value 114 by typing, speaking, scrolling, etc. the value, or other data entry methods known in the art.

The new value 114 may be stored in the data store 106, even if data store 106 is a temporary data store. For example, computer system 104 may add a data row to the data store that includes the new value 114. The new value may be stored as a temporary instance in the temporary data store. In some examples, new value 114 may be associated with a time, so that when multiple values are present in data store 106 for the same attribute (e.g., price, description, quantity, etc.) of an item, the computer system 104 can determine which value is the most recent and/or appropriate new value 114. In some examples, data store 106 may only include one data row associated with the attribute and write over that value with the new value 114 (e.g., a second new value overwrites a new value received earlier in time for the same attribute, etc.).

The new value 114 may be limited. For example, computer system 104 may receive the new value 114. The computer system 104 can compare the new value 114 with a threshold price difference (e.g., new value 114 cannot be more than 10% price difference from the current value 112), a second value (e.g., "the lowest price for this item offered by other merchants is $10 and your price is $15," etc.), or a merchant profile (e.g., "the merchant must sell this item for $10 to make a profit," etc.). Based in part on the comparison, the computer system 104 can limit the new value 114.

In some examples, the new value 114 is limited to a range of values. For example, the computer system 104 can receive a value range for the item that includes one or more values for the item. In the illustration where the value is a price, the range of values may include $10-$20 (e.g., plus/minus $50 of a market price, etc.). When the value is a quantity, the range of values may include 1 to less than 100. When the value is a description, the range of values may limit characters (e.g., less than 500 characters, etc.) or length of the description (e.g., less than 5 lines of text, etc.). Other value ranges are available as well, without diverting from the scope of the disclosure. The new value 114 may be compared with the range of values to determine whether the new value for the item is within or outside of the value range.

The process 100 may also include updating the user interface at 120. For example, the computer system 104 may receive the request from user device 108 via network page 110 and enable display of the temporary instance of the new value 114. The computer system 104 may update the display on the network page 110 with a notification 122. The notification 122 can inform the user device 108 that the request was received, and in some examples, include information associated with the new price (e.g., the value associated with the new price, the time the request was received, an estimated wait time when the current value 112 will be updated to the new value 114, etc.). In some examples, the current value 112, new value 114, and notification 122 may be enabled to display on a merchant network page that is inaccessible to consumers. A sample notification is provided with FIG. 3.

The notification 122 may be transmitted using various types of communications. For example, the notification 122 may be incorporated with the text of the network page (e.g., by amending the markup language of the network page, including HyperText Markup Language ("HTML") or Extensible Markup Language ("XML"), etc. to include the notification 122, etc.). In some examples, the notification 122 is provided as a second layer on the interface of the network page 110 (e.g., in a pop-up window or frame, etc.). In some examples, the notification 122 may be provided directly to the user device 108 (e.g., via a text message, email, to inform a web services computer or administrator, etc.).

When the new value 114 is compared with a range of values, the notification 122 may include information corresponding with the comparison and/or value range. The comparison may be implemented by one or more other computer systems 132 (illustrated as computer system 132A, computer system 132B, and computer system 132C). For example, the computer system 104 or the one or more other computer systems 132 can determine that the new value 114 for the item is outside of the value range and display the notification 122 that informs the user of the value range. The notification 122 can provide information associated with the value range (e.g., the limitations associated with the value range, information for the user to change the new value to a value that corresponds with the value range, etc.). In some examples, the notification 122 can include information about the comparison (e.g., "you won't make a profit on this item if you choose this price," etc.).

In some examples, providing the notification 122 can correspond with other actions. For example, after the notification is provided (e.g., that informs the user of the value range, etc.), the computer system 104 can receive a second request that includes a second new value for the item. The second new value may be within the value range. When the second new value is again outside of the value range, the notification may again inform the user of the value range and/or suggest another new value. The display may be updated to provide information associated with the second new value and/or value range.

The notification 122 can also inform the user whether the new value 114 is stored in the temporary data store or a master data store (e.g., associated with other computer systems). For example, the notification 122 may include information that the new value that is outside the value range and is not stored in a temporary data store associated with computer system 104. In another example, the new value 114 may be stored in the temporary data store without first comparing the new value with a range of values (e.g., no limitations on the new value, the new value is checked after the new value is stored in the temporary data store, etc.).

The process 100 may also include updating one or more computers associated with a distributed system at 130. For example, the computer system 104 can interact with one or more other computer systems 132 (illustrated as computer system 132A, computer system 132B, and computer system 132C). In some examples, the computer system 104 may be associated with the one or more other computer systems 132 as part of the same infrastructure or distributed network of computer systems (e.g., the same entity manages both the computer system 104 and the one or more other computer systems 132, the same entity is an electronic marketplace of merchants that provide items for purchase to consumers, etc.). In some examples, the computer system 104 and the one or more other computer systems 132 may be unassociated (e.g., computer system 104 is managed by a first entity and the one or more other computer systems 132 are managed by third party entities, etc.).

The computer system 104 may transmit the new value 114 to one or more other computer systems 132. For example, the new value 114 may be transmitted in a communication via a network. The one or more other computer systems 132 may be configured to process the new value (e.g., price update) by changing a master instance of the value (e.g., price) in a master data store (not shown) to the new value 114. In some examples, multiple instances of a master data store may be implemented in the system and/or may correspond with different attributes of the items (e.g., one data store for prices, one data store for quantities, etc.).

The computing system 104 may transmit data 134 (e.g., including the new value or other relevant information associated with a merchant, item, or update request, etc.) from the data store 106 to the one or more other computer systems 132. For example, computing system 104 can transmit the current value 112, new value 114, or other information (e.g., item identifiers, attributes associated with the item that identify the value, etc.) to one or more other computer systems 132. The one or more other computer systems 132 can update the corresponding data store with the data 134.

The one or more other computer systems 132 may maintain a master data store. For example, the computing system 104 can provide the new value 114 to the one or more other computer systems 132, and the one or more other computer systems 132 may be enabled to update the current value 112 to the new value 114 in the master data store.

The computer system 104 and one or more other computer systems 132 may be associated with a single entity. The single entity may maintain computer systems from multiple locations, or contract with third party entities to provide computing services on behalf of the single entity. The communications between the locations and/or process failures (e.g., missing communication, reboot/restart commands, system update, data update, etc.) at the one or more other computer systems 132 may add latency, based in part on multiple factors. For example, the third party computer service providers may institute firewalls or other protections that may check incoming communications before allowing them to be processed (e.g., adding latency). In another example, the physical distance between the co-located computer systems may add the latency, based in part on the time that the communication needs to travel to traverse the distance.

The one or more other computer systems 132 may be updated using one or more web services, which may introduce latency during an update process. For example, the one or more other computer systems 132 may receive the request to update a master instance of a value in a master data store. A first computer system in the one or more other computer systems 132 may store the item description associated with the value, a second computer system in the one or more other computer systems 132 can store the value (e.g., price), and a third computer system in the one or more other computer systems 132 can store a timestamp of the update.

One or more of the computer systems can implement web services to communicate with the other computer systems and initiate processes to update master instances of the data. The web services can interact with each of these computer systems to submit the new value to the master data store corresponding with each computer system. In some examples, the processes may run sequentially (versus in parallel), so that the second update is not processed before the first update completes. When multiple computers in the one or more other computer systems 132 need to updated, the latency associated with the updates may be relatively substantial (e.g., 1000 milliseconds, etc.).

Communications with the other sources may be associated with latency as well. For example, computer system 104 may be associated with a large infrastructure of computers that communicate frequently. In some examples, the computer system 104 may transmit a communication (e.g., an inventory request that includes a request for inventory information from a master data store) and the computer system 104 may wait to receive the data in response to the request and/or a confirmation that the request was received.

One or more other computers in the distributed system may include an update queue. As a sample illustration, Computer A may maintain current pricing information for items offered for purchase by a merchant and Computer B may display the current pricing information on a web page for the merchant. Computer B may transmit a request to Computer A for the information. When the communication arrives at Computer A, the communication may be added to Computer A's update queue. Computer A may process the request and other similar requests in an order in which they are received (e.g., first-in-first-out (FIFO), etc.) or through any communication processing algorithm known in the art. Once the request is processed, Computer A can generate a response to the request and transmit it back to Computer B.

The request may include a request to update the information maintained by Computer A. For example, Computer B may receive a request to update a value for an item and transmit an update request to Computer A that includes the new value for the item. The request may be added to the update queue for Computer A and, if there are several requests, cause a delay in updating the value at Computer A. In some examples, one or more other computers in a distributed system store data along with Computer A, so that when data needs to be updated at one or more of these computers, requests to update the data cause delays when each of these update queues are impacted (e.g., full, etc.).

Returning to the illustration in FIG. 1, the one or more other computer systems 132 may transmit a confirmation back to computing system 104. The confirmation may include information that the updates are complete or identify that the new "current" value (e.g., stored in a master data store, stored with the one or more other computer systems 132, etc.) that corresponds with new value 114. In some examples, once the value in the master data store has been updated to the new value identified in the request, the one or more other computer systems 132 can generate the confirmation. The confirmation may include information associated with the new value (e.g., "the price for item A100 has changed from $10 to $8," "A100=$8," etc.). The confirmation may also include a time that the update occurred or other relevant information, and transmit the confirmation back to the computing system 104.

The one or more other computer systems 132 may also update data in response to the request from computer system 104. For example, the one or more other computer systems 132 may maintain master instances of values associated with the merchant's inventory. When the request is received from the one or more other computer systems 132, the one or more other computer systems 132 can parse the request to identify the merchant, item, and value, find the corresponding information in the master data store, and update the value in the master data store to the new value identified in the request. When multiple instance of the item or value exist (e.g., the merchant sells many items, etc.), the request may specify if one or more of the values are updated to the new value in response to the request and/or default to updating all values.

The computer system 104 may be notified that the data has been updated by the one or more computer systems. For example, the computer system 104 may transmit the initial request to update the current price to the new price, then wait for a threshold amount of time. The computer system 104 can transmit a second request to the one or more other computer systems 132 for the current price. When a price is received from the one or more other computer systems 132 that matches the new price (e.g., the computer system 104 compares the received price with the new price, etc.), then the computer system 104 can determine that the price was updated to the new price in the one or more other computer systems 132. The price received from the one or more other computer systems 132 may be the official price (e.g., master instance of the price) associated with the merchant, item, and value.

In some examples, user device 108 may transmit a request to update or refresh the network page 110 (e.g., by an active request to receive the data, by an active request to refresh the network page, by a passive request after a threshold amount of time that automatically refreshes a network page, etc.). When the computer system 104 receives the request from the user device 108, the computer system 104 can transmit a request (e.g., to one or more other computer systems 132, etc.) for the data to populate the network page 110 (e.g., as a trigger to compare two sources of data, etc.). The computer system 104 can receive the data, compare it with the new value 114, and, if the values match, determine that the data was updated to the new value 114 (e.g., in the master data store, etc.). In some examples, when the user requests a network page (e.g., including the new value 114), the value in the master data store is compared with the value in the temporary data store, and if they are the same, then the price in the temporary data store is deleted.

In some examples, the second request may be similar to an initial request to receive data for the network page 110. For example, the initial request to receive data may populate the network page 110 for a merchant to view the current values associated with the item that the merchant is offering for purchase. The second request may request to receive data to populate the network page 110 for the merchant as well. The computer system 104 may receive a response to the second request, which can include the current/master value. The computer system 104 can parse the response to the second request and determine the current/master value in the response. The computer system 104 can compare the current/master value received in the response (e.g., stored in the master data store) with the new value 114 stored in the temporary data store 106 to determine if the two values match and the current/master value has been updated.

In some examples, the computer system 104 receives multiple responses from multiple one or more other computer systems 132. The computer system 104 can aggregate the received data to determine whether the information has been updated in the one or more other computer systems 132 (e.g., stored in multiple locations, etc.).

In some examples, a confirmation is transmitted from the one or more other computer systems 132 to the computing system 104. The computing system 104 may perform additional actions once the confirmation is received from the one or more other computer systems 132. For example, when a confirmation is received from the one or more other computer systems 132 that the price is updated to the new value 114 in the master data store, the new value 114 may be deleted from the temporary data store by the computing system 104. In some examples, when the user requests a network page (e.g., including the new value 114), the value in the master data store is compared with the value in the temporary data store, and if they are the same, then the price in the temporary data store is deleted.

In another example, when a confirmation is not received within a threshold amount of time, the computing system 104 can contact an administrator or web service computer associated with the computing system 104 or the one or more other computer systems 132 (e.g., was the new value received, should the communication be resent, etc.).

The network page 110 may be updated as well. For example, the notification 122 may be removed from the network page 110 and/or updated to inform the user that the new value has been accepted (e.g., by amending the markup language associated with the network page 110). In some examples, the new value may be accessible to a merchant (e.g., via the network page 110, etc.) or consumer (e.g., via different network pages accessible through different user devices, etc.). The notification may be removed after the new value 114 is deleted from the data store 106.

As a sample illustration, a process similar to process 100 can include receiving a request from a user to update a price, identifying the new price in the request, and storing the new price in the temporary data store (e.g., cache, etc.). A user interface that received the request to update the price may be updated to show that the new price is being updated. The notification may indicate that the new price is not official, but that the data is stored in a temporary or unofficial location. The system may wait (e.g., to account for latency, communication speeds, etc.). If the user refreshes the network page, the system can continue to show the user the data is stored in the temporary location until the data is stored in an official location. After the change has been saved in the master data store, the system may remove the notification from the user interface and/or inform the user that the data has been stored in the official location. In some examples, the system deletes the data stored in the temporary data store.

Figure 2:
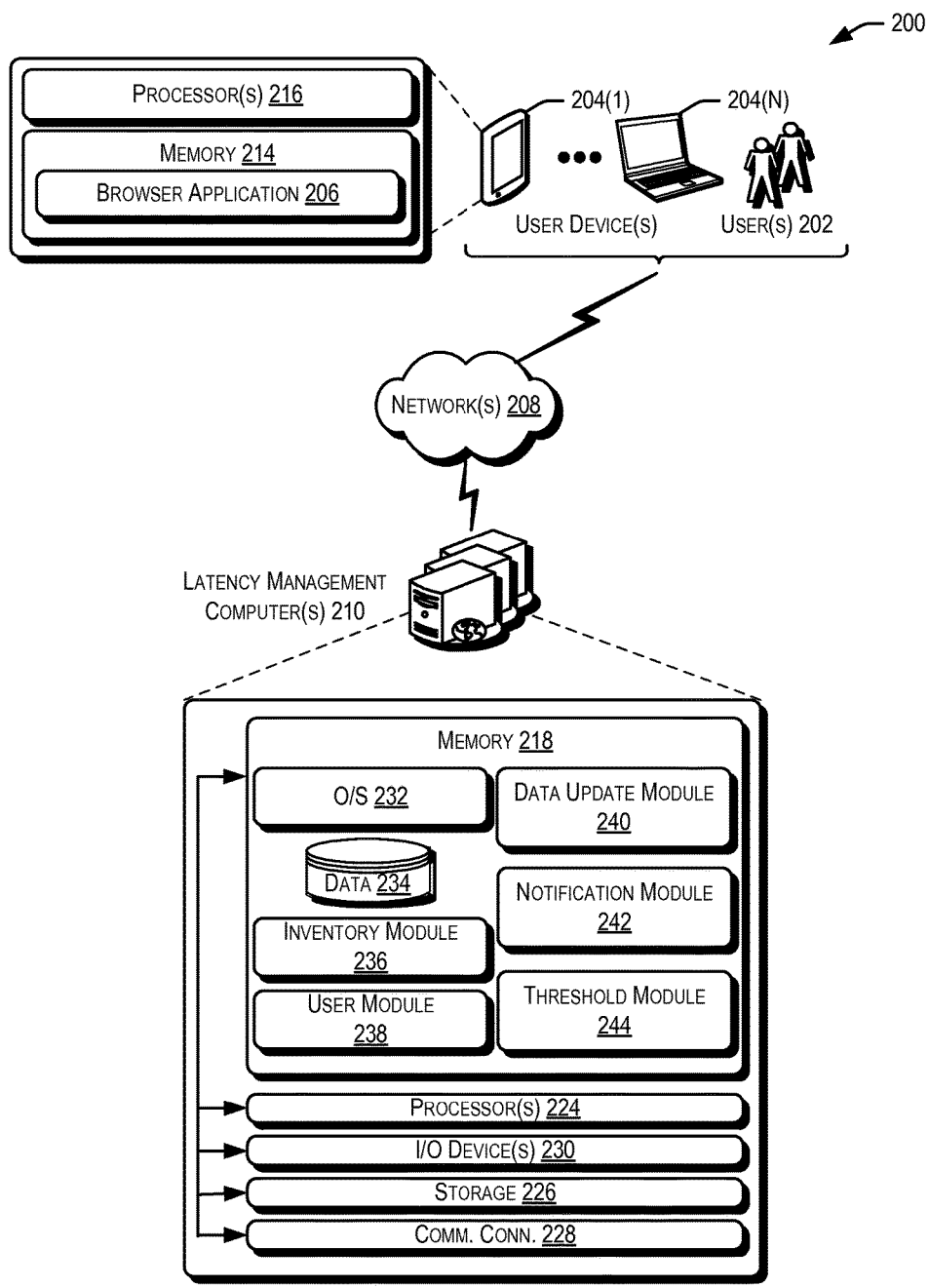
FIG. 2 illustrates an example architecture for determining a status of a system update with a long latency described herein that includes a latency management computer and/or a user device connected via one or more networks, according to at least one example.

FIG. 2 illustrates an example architecture for determining a status of a system update with a long latency described herein that includes a latency management computer and/or a user device connected via one or more networks, according to at least one example. In architecture 200, one or more users 202 (i.e., web browser users) may utilize user computing devices 204(1)-(N) (collectively, user devices 204) to access an application 206 (e.g., a web browser), via one or more networks 208. In some aspects, the application 206 may be hosted, managed, and/or provided by a computing resources service or service provider, such as by utilizing one or more service provider computers and/or one or more latency management computers 210. The one or more latency management computers 210 may, in some examples, provide computing resources such as, but not limited to, client entities, low latency data storage, durable data storage, data access, management, virtualization, cloud-based software solutions, electronic content performance management, etc. The one or more latency management computers 210 may also be operable to provide web hosting, computer application development, and/or implementation platforms, combinations of the foregoing, or the like to the one or more users 202. The one or more latency management computers 210, in some examples, may help determine a status of a system update with a long latency.

In some examples, the networks 208 may include any one or a combination of many different types of networks, such as cable networks, the Internet, wireless networks, cellular networks and other private and/or public networks. While the illustrated example represents the users 202 accessing the application 206 over the networks 208, the described techniques may equally apply in instances where the users 202 interact with the latency management computers 210 via the one or more user devices 204 over a landline phone, via a kiosk, or in any other manner. It is also noted that the described techniques may apply in other client/server arrangements (e.g., set-top boxes, etc.), as well as in non-client/server arrangements (e.g., locally stored applications, etc.).

As described briefly above, the application 206 may allow the users 202 to interact with a service provider computer, such as to access web content (e.g., web pages, music, video, etc.). The one or more latency management computers 210, perhaps arranged in a cluster of servers or as a server farm, may host the application 206 and/or cloud-based software services. Other server architectures may also be used to host the application 206. The application 206 may be capable of handling requests from many users 202 and serving, in response, various item web pages. The application 206 can provide any type of website that supports user interaction, including social networking sites, online retailers, informational sites, blog sites, search engine sites, news and entertainment sites, and so forth. As discussed above, the described techniques can similarly be implemented outside of the application 206, such as with other applications running on the user devices 204.

The user devices 204 may be any type of computing device such as, but not limited to, a mobile phone, a smart phone, a personal digital assistant (PDA), a laptop computer, a desktop computer, a thin-client device, a tablet PC, an electronic book (e-book) reader, etc. In some examples, the user devices 204 may be in communication with the latency management computers 210 via the networks 208, or via other network connections. Additionally, the user devices 204 may be part of the distributed system managed by, controlled by, or otherwise part of the latency management computers 210 (e.g., a console device integrated with the latency management computers 210).

In one illustrative configuration, the user devices 204 may include at least one memory 214 and one or more processing units (or processor(s)) 216. The processor(s) 216 may be implemented as appropriate in hardware, computer-executable instructions, firmware, or combinations thereof. Computer-executable instruction or firmware implementations of the processor(s) 216 may include computer-executable or machine-executable instructions written in any suitable programming language to perform the various functions described. The user devices 204 may also include geo-location devices (e.g., a global positioning system (GPS) device or the like) for providing and/or recording geographic location information associated with the user devices 204.

The memory 214 may store program instructions that are loadable and executable on the processor(s) 216, as well as data generated during the execution of these programs. Depending on the configuration and type of user device 204, the memory 214 may be volatile (such as random access memory (RAM)) and/or non-volatile (such as read-only memory (ROM), flash memory, etc.). The user device 204 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 214 may include multiple different types of memory, such as static random access memory (SRAM), dynamic random access memory (DRAM), or ROM.

Turning to the contents of the memory 214 in more detail, the memory 214 may include an operating system and one or more application programs or services for implementing the features disclosed herein, such as via the browser application 206 or dedicated applications (e.g., smart phone applications, tablet applications, etc.). The browser application 206 may be configured to receive, store, and/or display a website or other interface for interacting with the latency management computers 210. Additionally, the memory 214 may store access credentials and/or other user information such as, but not limited to, user IDs, passwords, and/or other user information. In some examples, the user information may include information for authenticating an account access request such as, but not limited to, a device ID, a cookie, an IP address, a location, or the like. In addition, the user information may include a user 202 provided response to a security question or a geographic location obtained by the user device 204.

In some aspects, the latency management computers 210 may also be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the service provider computers are executed by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment. In some examples, the latency management computers 210 may be in communication with the user devices 204 and/or other service providers via the networks 208, or via other network connections. The latency management computers 210 may include one or more servers, perhaps arranged in a cluster, as a server farm, or as individual servers not associated with one another. These servers may be configured to implement the content performance management described herein as part of an integrated, distributed computing environment.

In one illustrative configuration, the latency management computers 210 may include at least one memory 218 and one or more processing units (or processor(s)) 224. The processor(s) 224 may be implemented as appropriate in hardware, computer-executable instructions, firmware, or combinations thereof. Computer-executable instruction or firmware implementations of the processor(s) 224 may include computer-executable or machine-executable instructions written in any suitable programming language to perform the various functions described.

The memory 218 may store program instructions that are loadable and executable on the processor(s) 224, as well as data generated during the execution of these programs. Depending on the configuration and type of latency management computers 210, the memory 218 may be volatile (such as RAM) and/or non-volatile (such as ROM, flash memory, etc.). The latency management computers 210 or servers may also include additional storage 226, which may include removable storage and/or non-removable storage. The additional storage 226 may include, but is not limited to, magnetic storage, optical disks and/or tape storage. The disk drives and their associated computer-readable media may provide non-volatile storage of computer-readable instructions, data structures, program modules and other data for the computing devices. In some implementations, the memory 218 may include multiple different types of memory, such as SRAM, DRAM, or ROM.

The memory 218, the additional storage 226, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 218 and the additional storage 226 are all examples of computer storage media. Additional types of computer storage media that may be present in the latency management computers 210 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the latency management computers 210. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The latency management computers 210 may also contain communications connection(s) 228 that allow the latency management computers 210 to communicate with a stored database, another computing device or server, user terminals and/or other devices on the networks 208. The latency management computers 210 may also include I/O device(s) 230, such as a keyboard, a mouse, a pen, a voice input device, a touch input device, a display, speakers, a printer, etc.

Turning to the contents of the memory 218 in more detail, the memory 218 may include an operating system 232, one or more data stores 234, and/or one or more application programs or services for implementing the features disclosed herein including inventory module 236, user module 238, data update module 240, notification module 242, and/or threshold module 244. The modules may be software modules, hardware modules, or a combination thereof. If the modules are software modules, the modules will be embodied on a computer readable medium and processed by a processor in any of computer systems described herein.

The inventory module 236 may be configured to accept inventory or item information from one or more data sources. From the inventory or item information, the inventory module 236 may be configured to determine attributes (e.g., price, description, quantity) or values (e.g., price=$10, description="Acme Co. t-shirt," quantity=10, etc.) for a user (e.g., merchant, etc.).

The user module 238 may be configured to manage information associated with the user (e.g., merchant, consumer, etc.). For example, the user module 238 may maintain a profile for a merchant, identify items associated with the merchant, and identify items and values associated with other merchants.

The data update module 240 may be configured to accept a new value, add/change a value in a temporary data store, and communicate the new value with other computer systems in a distributed computer network. The communication may include the new value and may help enable the other computer systems in a distributed computer network to update other data stores with the new value (e.g., a master data store, etc.). The data update module 240 may be configured to receive a confirmation from the other computer systems when other data sources are updated. In some examples, the data update module 240 may be configured to delete values from the temporary data store.

The notification module 242 may be configured to provide a notification. For example, the notification may be provided to a merchant (e.g., to inform the merchant that the new value has been received and/or is being updated in a master data store, etc.). The notification may be provided to other computer systems as well (e.g., user device, storage system, etc.).

The threshold module 244 may be configured to compare a new value with an existing value (e.g., to confirm that the new value is new, based on a threshold amount of time, threshold price difference, a lowest/highest value, etc.). The threshold module 244 may also be configured to compare the new value with a range of values, with a user/merchant profile, and the like. In some examples, the threshold module 244 may also be configured to restrict saving the new value to the temporary data store or master data store(s). In some examples, the threshold module 244 may also be configured to interact with the notification module 242 (e.g., to send a notification when the new value is outside of a value range or threshold, etc.).

FIG. 3 illustrates an example of a user interface for receiving data described herein, according to at least one example. In illustration 300, a computing device (not shown) provides a network page 302 for a user device (not shown). Examples of the computing device and the user device are illustrated in FIG. 2 as the latency management computers 210 and user devices 204, respectively.

The network page 302 can include one or more items in a merchant's inventory. The inventory information can include a status of the item (e.g., active, inactive, out of stock, etc.), images of the item, item identifier, item description, sale price, shipping price, and other relevant information.

The merchant's inventory may be associated with a profile of the merchant. The profile may identify a merchant (e.g., username, device, location, etc.), items that the merchant offers for purchase (e.g., via an electronic marketplace, etc.), and values associated with those item (e.g., a current value, a new value, prices, quantities, descriptions, etc.). The profile may also include an interaction history of requests. For example, when the merchant requests to update a value for an item to a new value, the interaction history may be updated to include the item, a time of the request, the value, and the new value.

The network page 302 may also include a notification 304. For example, the user may change a price for the first item from $15 to $9.98 and a notification may appear on the network page (e.g., when the user submits or enters the new value, etc.). The notification 304 may be integrated with the markup language of the network page 302 (e.g., HTML, XML, etc.) and inform the user that the updated was received. As illustrated, the notification 304 includes "Unofficial update successful. It may take up to 15 minutes for the change to take effect in other systems."

Figure 4:
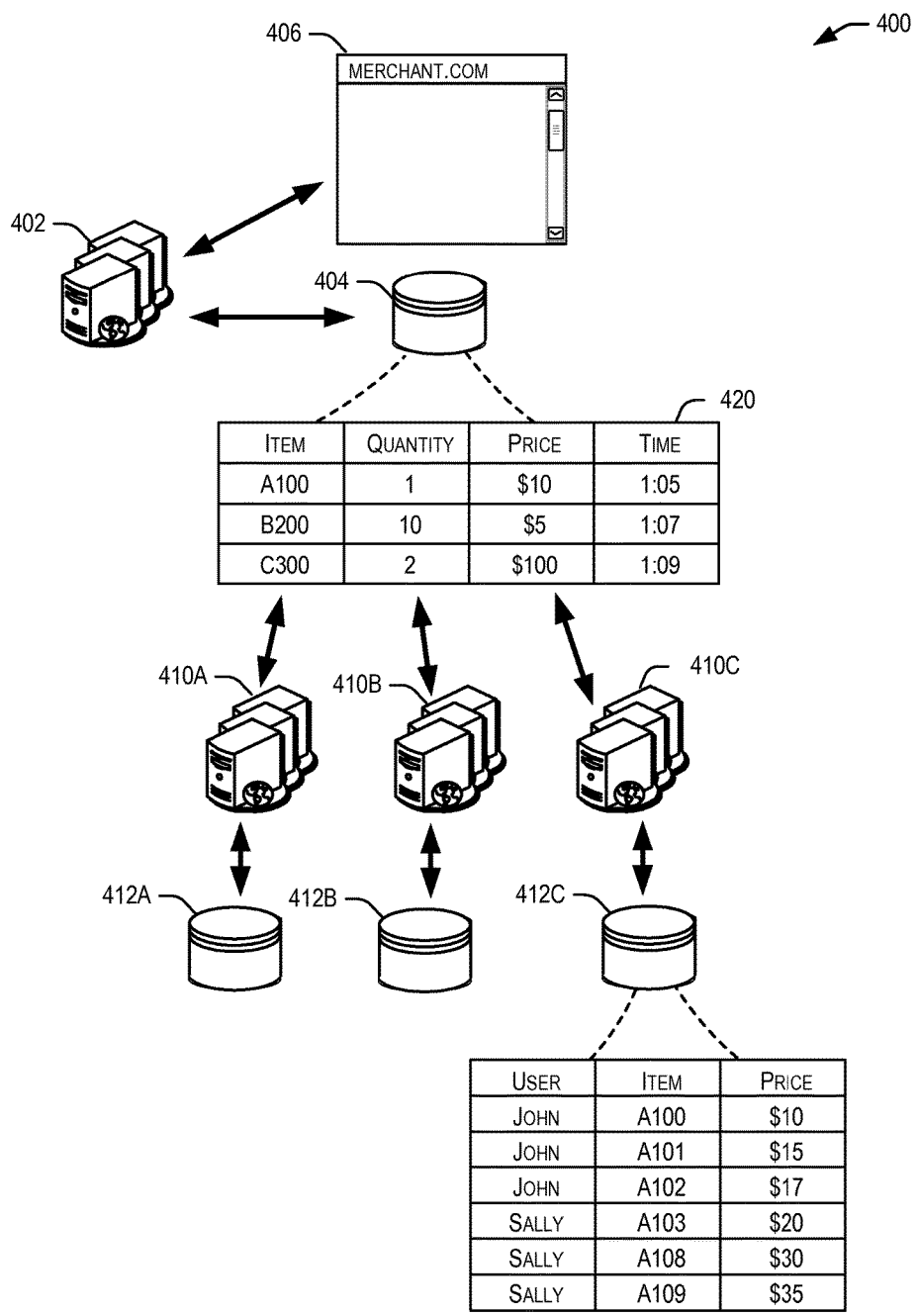
FIG. 4 illustrates an interaction between a temporary data store and a distributed system of computer devices described herein, according to at least one example.

FIG. 4 illustrates an interaction between a temporary data store and a distributed system of computing devices described herein, according to at least one example. In illustration 400, a computing device 402 interacts with a data store 404. Examples of the computing device 402 and data store 404 are illustrated in FIG. 2 as the latency management computers 210 and data store 234, respectively. In some examples, examples of the distributed system of computing devices 410 (illustrated as computing device 410A, computing device 410B, and computing device 410C) and one or more master data stores 412 (illustrated as master data store 412A, master data store 412B, and master data store 412C) may also be similar to the latency management computers 210 and data store 234, respectively. Data may be provided to a network page 406 from the computing device 402.

The computing device 402 may interact with a data store 404 to receive information and provide the information to a network page 406. The information may be received from multiple sources, including from a distributed system of computing devices 410 (illustrated as computing device 410A, computing device 410B, and computing device 410C). The distributed system of computing devices 410 may maintain one or more master instances of values for the distributed system in one or more master data stores. As illustrated, computing device 410A may provide item identifier data, computing device 410B may provide quantity data (e.g., the number of items of a particular item identifier that a merchant offers for purchase, etc.), and computing device 410C may provide price data (e.g., the price of items of a particular item identifier that a merchant offers for purchase, etc.). The distributed system of computing devices 410 may interact with corresponding master data stores to receive the data.

An example of a portion of a master data store is illustrated with master data store 412C. In master data store 412C, one or more prices for one or more items may be associated with one or more users. For example, user John offers for purchase three items corresponding with item identifiers A100, A101, and A102 at prices $10, $15, and $17, respectively.

One or more master data stores 412 may be a primary data store for a particular type of data (e.g., the master instance of the price, etc.) and, in some examples, other data sources may replicate this data throughout the distributed system of computing devices. The master data stores 412 may also include configuration information for the corresponding computing device. This may include information about logon accounts, configuration settings, or startup stored procedures.

The computing device 402 may interact directly with the distributed system of computing devices 410 (not shown). For example, when a user requests a new price for an item, the computing device 402 can provide the new price to one or more computing devices in the distributed system of computing devices 410. One or more of these computing devices can update the corresponding master data store and/or provide a confirmation back to computing device 402 when the value has been updated in the master data store. The interaction between the computing device 402 and the distributed system of computing devices 410 may be implemented by a backend processing application that transfers communications between the various computing devices.

The data values may be confirmed and/or checked. For example, the data received from the distributed system of computing devices 410 is compared with the new value provided by the user (e.g., stored in data store 404). When the values differ, the new value may be transmitted to the appropriate computing device in the distributed system of computing devices 410. In some examples, the new value may overwrite an older value. In some examples, the data store 404 may include a timestamp 420 and/or notification provided via the network page to notify the user that the new value has been received. When the values differ, the value associated with the later timestamp may be transmitted to the appropriate computing device in the distributed system of computing devices 410. When the newer values overwrite the older values, the only value stored in the temporary data store may be transmitted to the appropriate computing device. The timestamp 420 may also be used to identify latency, as discussed with at least FIG. 5.

Figure 5:
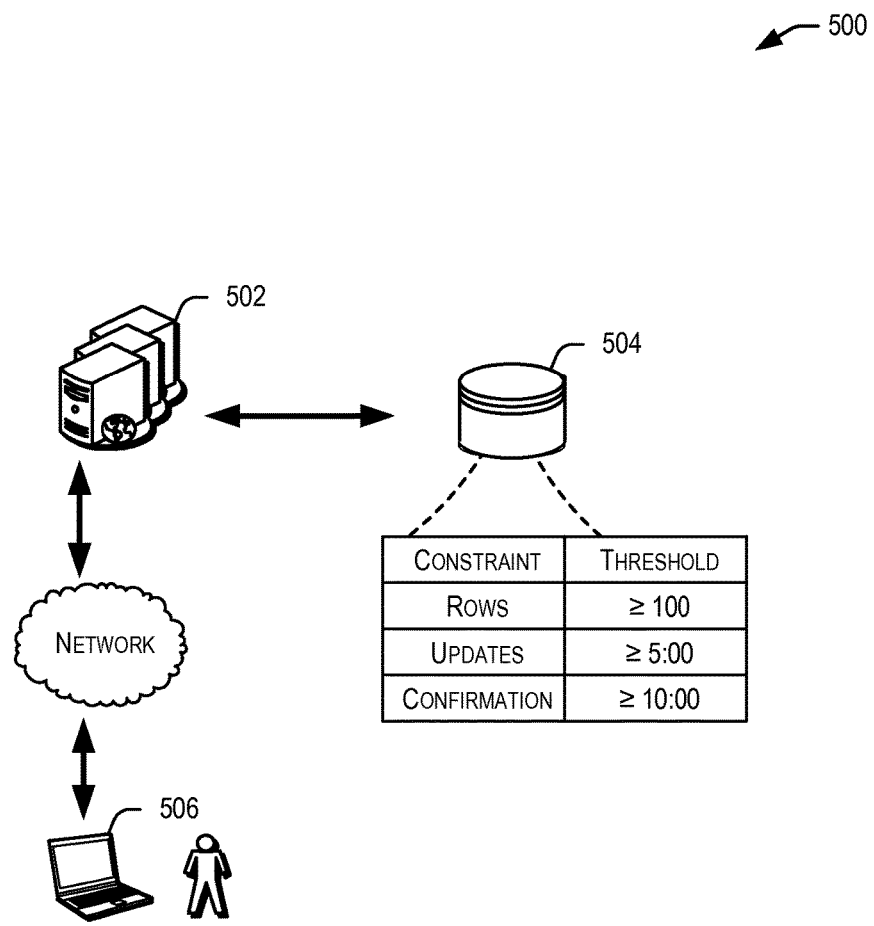
FIG. 5 illustrates example thresholds and constraints for determining latency described herein, according to at least one example.

FIG. 5 illustrates example thresholds and constraints for determining latency described herein, according to at least one example. These thresholds and constraints may correspond with the actions performed by the first computing device or second computing device after the temporary instance of the new value or new price is stored in a temporary data store. In illustration 500, a computing device 502 interacts with a data store 504 and the computing device 502 can interact with a user device 506 over a network. Examples of the computing device 502, data store 504, and user device 506 are illustrated in FIG. 2 as the latency management computers 210, data store 234, and user devices 204, respectively.

The data store 504 may be associated with one or more constraints. The constraints may help determine whether data should be deleted from the data store or any other actions discussed throughout the disclosure (e.g., deleting rows in a data store, optimizing look-up functions in the data store, initiating a transaction log, implementing version control, contacting a data store administrator or web service computer, etc.). As illustrated, the constraints may correspond with a limit to the number of rows in the data store 504 (e.g., no more than 100 rows or lines of data), the length of time needed to update a master data store (e.g., wait no longer than 5:00 minutes), or the length of time needed to receive a confirmation from a computing device in a distributed system (e.g., must receive a confirmation of receipt of the request to update data within 10:00 seconds), and the like.

The one or more constraints may correspond with incomplete requests. For example, the computing device 502 may receive ten requests to update prices from ten different users. The data store 504 may include each of these ten requests (e.g., because these new values have not been deleted from the data store yet). The computing device 502 can transmit the requests to the corresponding computing devices to update the master data stores. When one of the master data stores has been updated, the computing device 502 can delete the single row of data from the data store 504, so that only nine requests to update prices are stored in the data store 504.

In some examples, the latency in updating the master data stores may cause one or more constraints or thresholds to be exceeded. For example, as illustrated with the ten requests to update prices, additional requests may be received from other users so that a total of 100 requests to update prices are received for 100 different items. These 100 requests may be stored as one row for each item in the temporary data store. For example, when the 100 requests correspond with 100 different items, individual rows for each item may be included with the data store 506, thus causing the number of rows in the data store to exceed the row constraint or threshold. In another example, when the 100 requests correspond with the same item, one row may be included with the data store 506, thus causing the number of rows in the data store not to exceed the row constraint or threshold.

In some examples, an action may be triggered. For example, a temporary instance of a new value may be stored in the temporary data store at 1:00 and a current time associated with the computing device 502 can be 20:00. The constraint or threshold may identify that temporary instances that are stored in the data store for more than 10:00 may trigger a notification to the computing device 502. In some examples, the action may correspond with deleting data. For example, the temporary instance may be overwritten in response to exceeding the threshold amount of time or after the current time passes a value (e.g., deleted at the end of the day, etc.). In some examples, the temporary instance may be deleted in response to exceeding a threshold number of rows in the temporary data store.

The action may correspond with an alert. For example, the temporary data store may incorporate an alert with the adding or deleting rows from the data store exceeds a standard operation or threshold amount of time. The standard operation may be defined by observing actions between a time frame (e.g., normally 100 rows in the temporary data store between 8 am and 5 pm, 200 rows in the temporary data store between 5 pm and 8 pm, and 50 rows in the temporary data store between 8 pm and 8 am, etc.), and generating an alert when the operations diverge from the standard operations. Thresholds may be incorporated with the alert as well (e.g., 10% more rows than normal during a time frame triggers the alert, etc.).

When a constraint or threshold is met or exceeded, a communication and/or alert may be sent to the user device 506. The user device 506 may troubleshoot the issue (e.g., a computing device in the distributed system of computing devices is offline, a network connection is down, etc.).

Figure 6:
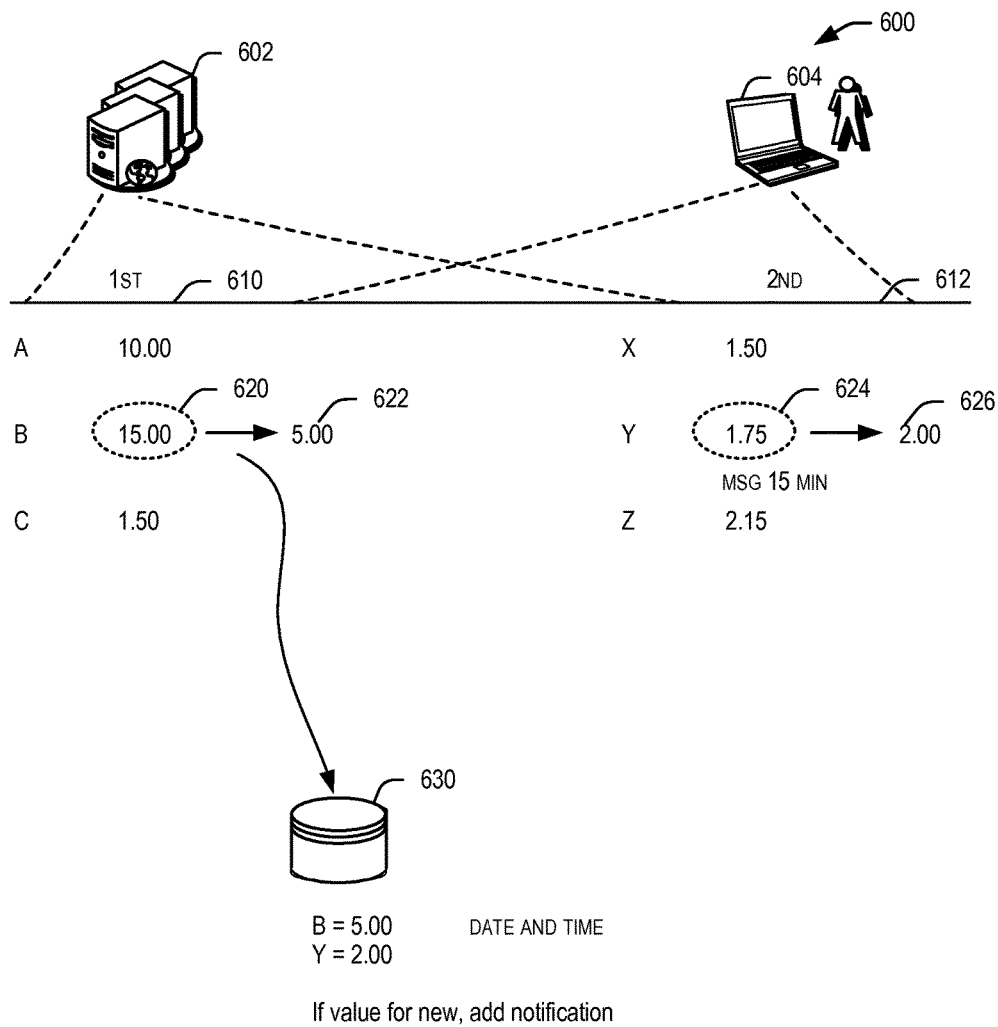
FIG. 6 illustrates latency with multiple network pages described herein, according to at least one example.

FIG. 6 illustrates latency with multiple network pages described herein, according to at least one example. In illustration 600, a computing device 602 and user device 604 interact with a first network page 610 and a second network page 612. Examples of the computing device 602 and user device 604 are illustrated in FIG. 2 as the latency management computers 210 and user devices 204, respectively.

The user device 604 may access the first network page 610 with three items displayed on the network page. The three items may correspond with three values, including 10.00, 15.00, and 1.50, respectively. The user device 604 can provide a request to update the value for the second item 620 to 5.00 as the new value 622. In systems without the use of embodiments of the disclosure, the new value 622 may be lost when the user refreshes a browser application that accesses the first network page 610 before the computing device 602 has stored the new value (e.g., locally in data store 630, remotely in a master data store in a distributed computing system, etc.). In some examples of systems without the use of embodiments of the disclosure, a temporary data store (e.g., data store 630) may not be implemented. The new value 622 may also be lost when the user device 604 browses to a second network page 612.

In some examples of the disclosure, the new value may be stored in the data store 630. This may allow the user to refresh the browser application (e.g., submit a refresh request to a browser application stored locally on user device 604) without losing the new value before the new value has been updated. This may also allow the user to browse to the second network page 612 without losing the new value on the first network page 610. In some examples, the computing device 602 may receive and/or identify that a refresh request was submitted to a browser application by the user device 604 (e.g., by transmitting a notification to the computing device 602, via the browser application that interacts with the network page). After the refresh request is received, the computing device may provide the new value 622 instead of the value for the second item 620.

On the second network page 612, the user device 604 may again request to update a value for the item 624 to a new value 626 (e.g., value for item Y from 1.75 to 2.00). The computing device 602 may store the new value with the data store 630. In some examples, the new value 626 may be stored with the data store 630 until the new value has been updated with a master data store and/or confirmation is received of the update from the computing device associated with the master data store. A notification may also be displayed on the second network page 612, as illustrated throughout the disclosure.

Figure 7:
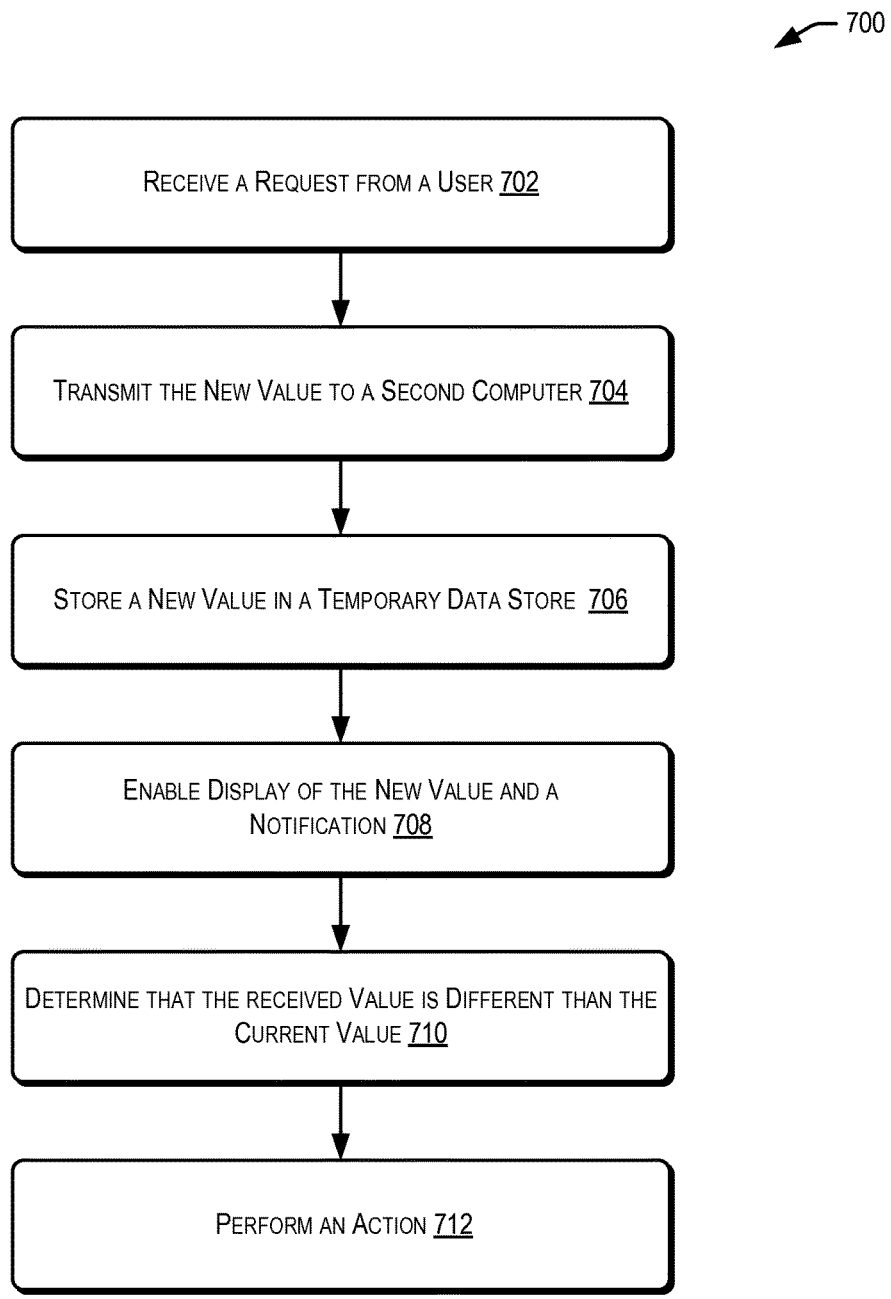
FIG. 7 illustrates an example flow diagram for determining a status of a system update with a long latency described herein, according to at least one example.

FIG. 7 illustrates an example flow diagram for determining a status of a system update with a long latency described herein, according to at least one example. In some examples, the one or more latency management computers 210 (e.g., utilizing at least one of the inventory module 236, user module 238, data update module 240, notification module 242, and/or threshold module 244) or one or more user devices 204 shown in FIG. 2 may perform the process 700 of FIG. 7.

Some or all of the process 700 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The process 700 may begin at 702 by receiving a request from a user. For example, a first computer system (e.g., latency management computers 210) may receive a request to update a value associated with an attribute of an item to a new value. In some examples, the value may be a price associated with an item offered for purchase from a merchant.

At 704, the new value may be transmitted to a second computer (e.g., one or more computers in a distributed system of computing devices). For example, a first computer system may generate a communication and transmit the communication with the new value (e.g., price, etc.) to a second computer system. The second computer system may be enabled to parse the communication, identify the new value (e.g., which corresponds with an item, current value, merchant, etc.), and update the value to the new value in a master data store.

At 706, the new value may be stored in a temporary data store. For example, a first computer system may store the new value in a temporary data store associated with the first computer. The temporary data store may include a cache or other memory device where data may be deleted frequently.

At 708, a display of the new value and notification may be enabled. For example, a first computer system may provide the new value (e.g., price, etc.) to a network page that is accessed by a browser application at a user device. In some examples, the notification may identify the new value, previous value, or other information associated with the update.

At 710, a received value may be determined to be different than the current value. For example, a first computer system may request and/or receive a master value from the second computer system. The first computer system can compare the received value with the value that is stored with the temporary data store. The first computer system may determine that the values are different and/or match based in part on the comparison. In some examples, when the values match, the first computer system may determine that the master value has been updated in the second computer system.

At 712, an action may be performed. For example, the first computer system may perform an action based in part on the determination that the values match and/or when a threshold amount of time elapses. The first computer system may delete the new value from the temporary data store when the first computer system determines that the new value has been updated in the master data store. The action may be performed after a threshold amount of time (e.g., with or without a determination in association with the master data store).

Illustrative methods and systems for determining a status of a system update with a long latency are described above. Some or all of these systems and methods may, but need not, be implemented at least partially by architectures such as those shown at least in FIGS. 1-7 above.

Figure 8:
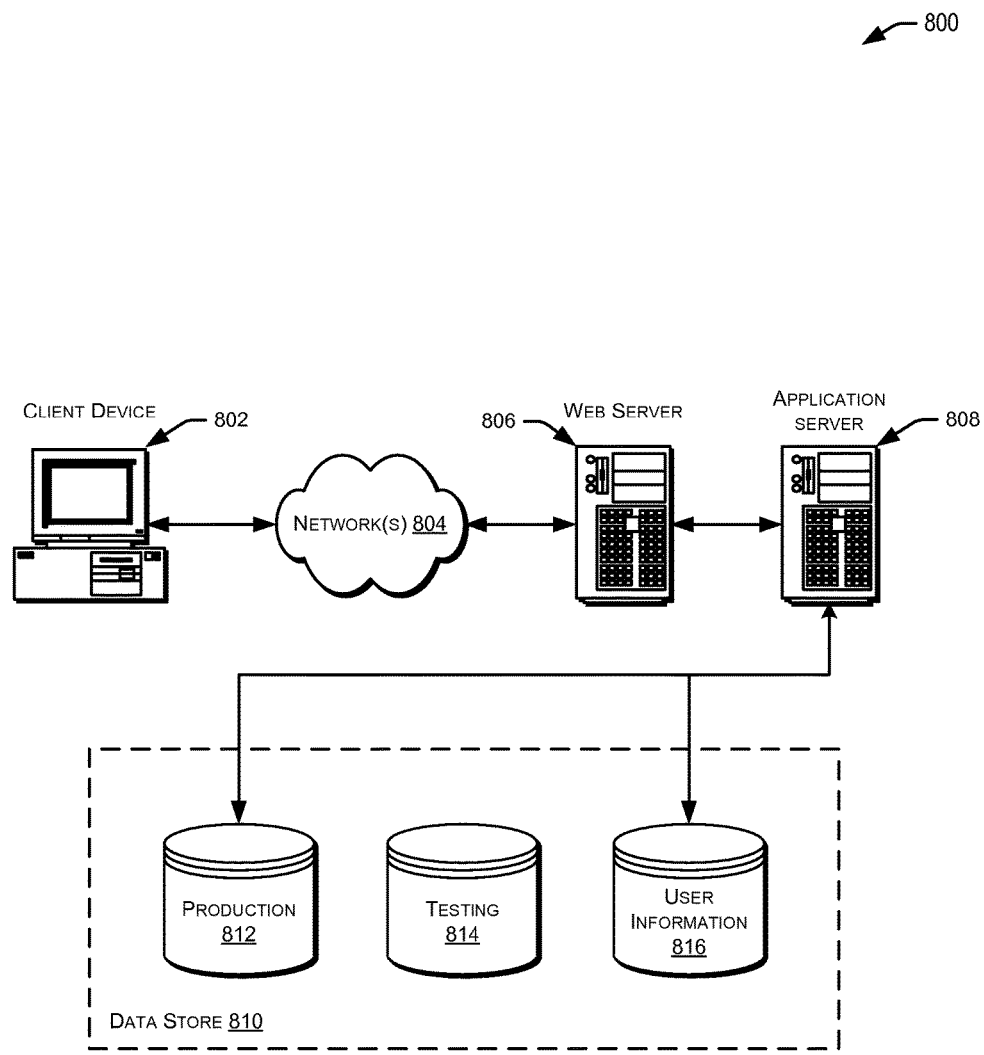
FIG. 8 illustrates an environment in which various embodiments can be implemented.

FIG. 8 illustrates aspects of an example environment 800 for implementing aspects in accordance with various embodiments. As will be appreciated, although a Web-based environment is used for purposes of explanation, different environments may be used, as appropriate, to implement various embodiments. The environment includes an electronic client device 802, which can include any appropriate device operable to send and receive requests, messages, or information over an appropriate network 804 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 802 and the application server 808, can be handled by the Web server. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing production data 812 and user information 816, which can be used to serve content for the production side. The data store also is shown to include a mechanism for storing log data 814, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions.

Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle, Microsoft®, Sybase, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method for updating a first value associated with an attribute of an item to a second value associated with the attribute of the item in a distributed system of computers, comprising:

receiving, by a first computer system of the distributed system of computers from a master data store, the first value associated with the attribute of the item;

displaying, by the first computer system to a user interface of a user device, the first value;

receiving, by the first computer system of the distributed system of computers, a first request to update the first value associated with the attribute of the item to the second value associated with the attribute of the item, the first request received via the user interface of the user device, and the first request transmitted by the user device via a communication network to the first computer system of the distributed system of computers;

transmitting the second value to a second computer system of the distributed system of computers, the second computer system configured to update the first value stored in the master data store and associated with the attribute of the item to the second value in the master data store, the update of the first value to the second value associated with a latency delay with respect to the transmitting;

calculating the latency delay with respect to the transmitting;

storing the second value in a temporary data store associated with the first computer system;

based at least in part on the calculated latency delay, enabling display of the second value, an estimated wait time corresponding with at least the calculated latency delay, and a notification about the second value to the user interface of the user device, the display of the second value corresponding to the temporary data store and not the master data store;

determining that the second value is different from the first value being updated;

transmitting a second request to the second computer system of the distributed system of computers, the second request requesting a master value from the master data store;

receiving the master value from the second computer system of the distributed system of computers, wherein the master value matches the second value; and switching a source of the display of the second value to the master data store from the temporary data store.

2. The computer-implemented method of claim 1, further comprising:

upon determining that the master value matches the second value, determining that the master value was updated according to the first request to update the first value to the second value.

3. The computer-implemented method of claim 1, further comprising:

after storing the second value in the temporary data store, identifying a refresh request from a browser application, the browser application used to access a presentation of the item by the first computer system of the distributed system of computers; and updating the notification to include the second value from the temporary data store.

4. The computer-implemented method of claim 1, wherein the first computer system performs an action, and the action includes providing notice to a web service of the second computer system of the distributed system of computers that indicates the latency delay in processing the update of the first value to the second value stored in the master data store.

5. The computer-implemented method of claim 1, wherein the first computer system performs an action, and the action includes updating the notification to include the estimated wait time.

6. The computer-implemented method of claim 1, further comprising: receiving, by the first computer system, an inventory request to receive inventory information associated with a user of the user device, wherein the inventory information identifies items that the user offers to consumers.

7. The computer-implemented method of claim 1, wherein the second value is associated with a time that the second value was received, and further comprising:
comparing the time with a current time to determine a time difference;
determining that the time difference exceeds a threshold amount of time;
generating an alert that identifies the time difference; and
transmitting the alert to the user device, the transmission of the alert based in part on the time difference exceeding the threshold amount of time.

8. The computer-implemented method of claim 1, wherein the displaying of the first value for the item on the user interface of the user device corresponds to a merchant network page that is accessible to consumers.

9. The computer-implemented method of claim 1, further comprising: upon updating the first value to the second value in the master data store, amending a markup language associated with the display of the second value and the notification to remove the display of the notification from the user interface.

10. The computer-implemented method of claim 1, wherein the second computer system implements one or more web services to update the master data store, and wherein the one or more web services process the update of the first value to the second value sequentially.

11. The computer-implemented method of claim 1, further comprising: transmitting the notification via text message or email to the user device.

12. The computer-implemented method of claim 1, wherein the latency delay is based in part on a physical distance between the first computer system of the distributed system of computers and the second computer system of the distributed system of computers.

13. One or more non-transitory computer-readable storage media collectively storing computer-executable instructions that, when executed by one or more computer systems, configure the one or more computer systems to collectively perform operations comprising:
receiving, by a first computer system of a distributed system of computers from a master data store, a first value associated with an attribute of an item;
displaying, by the first computer system to a user interface of a user device, the first value;
receiving, by the first computer system of the distributed system of computers, a first request to update the first value associated with the attribute of the item to a second value associated with the attribute of the item, the first request received via the user interface of the user device, and the first request transmitted by the user device via a communication network to the first computer system of the distributed system of computers;
transmitting the second value to a second computer system of the distributed system of computers, the second computer system configured to update the first value stored in the master data store and associated with the attribute of the item to the second value in the master data store, the update of the first value to the second value associated with a latency delay with respect to the transmitting;
calculating the latency delay with respect to the transmitting;
storing the second value in a temporary data store associated with the first computer system;
based at least in part on the calculated latency delay, enabling display of the second value, an estimated wait time corresponding with at least the calculated latency delay, and a notification about the second value to the user interface of the user device, the display of the second value corresponding to the temporary data store and not the master data store;
determining that the second value is different from the first value being updated;
transmitting a second request to the second computer system of the distributed system of computers, the second request requesting a master value from the master data store;
receiving the master value from the second computer system of the distributed system of computers, wherein the master value matches the second value; and
switching a source of the display of the second value to the master data store from the temporary data store.

14. A first computer system for updating a first value associated with an attribute of an item to a second value associated with the attribute of the item in a distributed system of computers, the first computer system comprising:
a memory configured to store computer-executable instructions; and
a processor in communication with the memory configured to execute the computer-executable instructions to at least:
receive, from a master data store, the first value associated with the attribute of the item;
display, to a user interface of a user device, the first value;
receive a first request to update the first value associated with the attribute of the item to the second value associated with the attribute of the item, the first request received via the user interface of the user device, and the first request transmitted by the user device via a communication network to the first computer system of the distributed system of computers;
transmit the second value to a second computer system of the distributed system of computers, the second computer system configured to update the first value stored in the master data store and associated with the attribute of the item to the second value in the master data store, the update of the first value to the second value associated with a latency delay with respect to the transmitting;
calculate the latency delay with respect to the transmitting;
store the second value in a temporary data store associated with the first computer system;
based at least in part on the calculated latency delay, enable display of the second value, an estimated wait time corresponding with at least the calculated latency delay, and a notification about the second value to the user interface of the user device, the display of the second value corresponding to the temporary data store;
determine that the second value is different from the first value being updated;

transmit a second request to the second computer system of the distributed system of computers, the second request requesting a master value from the master data store;

receive the master value from the second computer system of the distributed system of computers, wherein the master value matches the second value; and switch a source of the display of the second value to the master data store from the temporary data store.

* * * * *